(12) United States Patent
Suter et al.

(10) Patent No.: US 10,360,087 B2
(45) Date of Patent: Jul. 23, 2019

(54) WEB API RECOMMENDATIONS BASED ON USAGE IN CLOUD-PROVIDED RUNTIMES

(71) Applicant: INTERNATIONAL BUSINESS MACHINES CORPORATION, Armonk, NY (US)

(72) Inventors: Philippe Suter, New York, NY (US); Salman A. Baset, New York, NY (US); John E. Wittern, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 9 days.

(21) Appl. No.: 15/795,351

(22) Filed: Oct. 27, 2017

(65) Prior Publication Data

US 2019/0129773 A1    May 2, 2019

(51) Int. Cl.
*G06F 9/54* (2006.01)
*G06F 11/36* (2006.01)
*H04L 29/08* (2006.01)

(52) U.S. Cl.
CPC .............. *G06F 9/547* (2013.01); *G06F 9/546* (2013.01); *G06F 11/364* (2013.01); *G06F 11/3612* (2013.01); *H04L 67/02* (2013.01); *H04L 67/10* (2013.01)

(58) Field of Classification Search
CPC ...... G06F 9/546; G06F 9/547; G06F 11/3612; G06F 11/364; H04L 67/02; H04L 67/10
See application file for complete search history.

(56) References Cited

U.S. PATENT DOCUMENTS

| 7,461,369 | B2 * | 12/2008 | Zhao | G06F 11/3419 714/E11.195 |
| 7,707,173 | B2 * | 4/2010 | Nanavati | G06F 17/3089 705/7.27 |
| 7,945,485 | B2 * | 5/2011 | Kane, Jr. | G06F 17/30867 705/26.7 |
| 8,347,272 | B2 * | 1/2013 | Sugawara | G06F 8/75 712/203 |

(Continued)

OTHER PUBLICATIONS

Wikipedia, "HTTP 404," last retrieved from https://en.wikipedia.org/wiki/HTTP_404 on Jul. 22, 2018. (Year: 2018).*

(Continued)

*Primary Examiner* — Andrew M. Lyons
(74) *Attorney, Agent, or Firm* — F. Chau & Associates, LLC (57) ABSTRACT

A method for recommending a web application programming interface (API) includes: a cloud computing service retrieving test source code from a remote computer of the developer; the cloud computing service determining whether a call to a first web API among a plurality of web APIs is present in the test source code; and when it is determined that the call is present, the cloud computing service reading at least one log file to extract information about at least one application that has used the first web API; the cloud computing service determining a first quality of the first web API from the log file; and the cloud computing service sending a message to the remote computer recommending a second web API among the web APIs having a second quality higher than the first quality.

20 Claims, 8 Drawing Sheets

(56) References Cited

U.S. PATENT DOCUMENTS

| | | | | |
|---|---|---|---|---|
| 8,788,577 | B2* | 7/2014 | Podjarny | G06F 17/30905 709/203 |
| 9,715,545 | B2* | 7/2017 | Laredo | G06F 17/30864 |
| 2007/0150348 | A1* | 6/2007 | Hussain | G06Q 30/02 705/14.54 |
| 2007/0244823 | A1* | 10/2007 | Thomas Motley | G06F 21/123 705/59 |
| 2007/0288897 | A1* | 12/2007 | Branda | G06F 8/70 717/124 |
| 2008/0072210 | A1* | 3/2008 | Rush | G06F 8/33 717/121 |
| 2008/0222238 | A1* | 9/2008 | Ivanov | H04L 67/16 709/202 |
| 2009/0204594 | A1* | 8/2009 | Akkiraju | G06F 8/34 |
| 2010/0269044 | A1* | 10/2010 | Ivanyi | G06Q 30/02 715/736 |
| 2012/0030039 | A1* | 2/2012 | Fernandez Gutierrez | G06Q 30/0277 705/14.73 |
| 2014/0051417 | A1* | 2/2014 | Wuerch | H04W 8/205 455/418 |
| 2015/0121401 | A1* | 4/2015 | Laredo | G06F 9/54 719/328 |
| 2015/0363493 | A1* | 12/2015 | Laredo | G06F 17/30864 707/770 |
| 2016/0011951 | A1* | 1/2016 | Beskrovny | G06F 11/3684 714/37 |
| 2016/0012738 | A1* | 1/2016 | Shafigh | G09B 5/06 434/309 |
| 2016/0057107 | A1* | 2/2016 | Call | H04L 63/02 726/11 |
| 2016/0104067 | A1* | 4/2016 | Xu | G06F 17/30864 706/46 |
| 2016/0124742 | A1* | 5/2016 | Rangasamy | H04L 47/70 717/103 |
| 2016/0125042 | A1* | 5/2016 | Laredo | G06F 8/33 707/723 |
| 2016/0239546 | A1* | 8/2016 | Cuomo | G06F 8/10 |
| 2016/0277532 | A1* | 9/2016 | Lee | H04L 67/322 |
| 2016/0314301 | A1* | 10/2016 | Johns | G06F 21/577 |
| 2016/0330266 | A1* | 11/2016 | Bakhmutov | H04L 67/025 |
| 2016/0335168 | A1* | 11/2016 | Freiberg | G06F 11/3604 |
| 2017/0171049 | A1* | 6/2017 | Kriegesmann | H04L 47/70 |

OTHER PUBLICATIONS

T. Mishra and G. Raj, "QoS implementation in Web Services selection and ranking using data analysis," 2017 7th International Conference on Cloud Computing, Data Science & Engineering—Confluence, Noida, 2017, pp. 537-542. (Year: 2017).*

N. Thio and S. Karunasekera, "Automatic measurement of a QoS metric for Web service recommendation," 2005 Australian Software Engineering Conference, Brisbane, Queensland, Australia, 2005, pp. 202-211. (Year: 2005).*

E. Wittern et al., "API Harmony: Graph-based search and selection of APIs in the cloud," in IBM Journal of Research and Development, vol. 60, No. 2-3, pp. 12:1-12:11, Mar.-May 2016. (Year: 2016).*

Theo, Niko et al., "Automatic Measurement of a QoS Metric for Web Service Recommendation", Proceedings of the 2005 Australian Software Engineering Conference (ASWEC'05)—Mar. 29, 2005-Apr. 1, 2005.

Wittern, Erik et al., "Opportunities in Software Engineering Research for Web API Consumption ", 2017 IEEE/ACM 1st International Workshop on API Usage and Evolution (WAPI); May 23, 2017.

Wittern, Erik et al., "Statically Checking Web API Requests in JavaScript", Proceeding ICSE '17 Proceedings of the 39th International Conference on Software Engineering pp. 244-254; Buenos Aires, Argentina—May 20-28, 2017.

* cited by examiner

```
211 — function getLogURL(jobID) {
       console.log(" ** Job ID is  : " + jobID);

var c1 = "https://api.travis-ci.org/jobs/" + jobID + "/log.txt?deansi=true";
       var c2 = "https://s3.amazonaws.com/archive.travis-ci.org/jobs/" + jobID + "/log.txt";

return new Promise(function(resolve, reject) {
  212 —   request(c1, function (error1, response1, body1) {
             if(!error1 && response1.statusCode == 200) {
                 resolve(c1);
             } else {
  213 —         request(c2, function(error2, response2, body2) {
                   if(!error2 && response2.statusCode == 200) {
                       resolve(c2);
                   } else {
                       reject("Couldn't obtain log URL. Tried:\n  - " + c1 + "\n  - " + c2);
                   }
               });
             }
         });
       });
     }
```

```
{
   "requests": [
      {
            "url":
"https://api.travis...",
         "method": "get",
         "parameters": {
            ...
         }
      },
      {
            "url":
"https://s3.amazon...",
         "method": "get",
         "parameters": {
            ...
         }
      }
   ]
}
```

FIG. 6

```
REQ 109.86.71.185 [17/Oct/2016:13:41:31.315 +0000] GET "https://api.travis-ci.org/jobs/68384168/log.txt?deansi=true"
RES 109.86.71.185 [17/Oct/2016:13:41:31.820 +0000] GET "https://api.travis-ci.org/jobs/68384168/log.txt?deansi=true" 404
REQ 104.128.144.131 [17/Oct/2016:14:11:56.812 +0000] GET "https://s3.amazonaws.com/archive.travis-ci.org/jobs/68384168/log.txt"
RES 104.128.144.131 [17/Oct/2016:14:11:57.301 +0000] GET "https://s3.amazonaws.com/archive.travis-ci.org/jobs/68384168/log.txt" 200
```

WEB API RECOMMENDATIONS BASED ON USAGE IN CLOUD-PROVIDED RUNTIMES

BACKGROUND

1. Technical Field

The present disclosure relates generally to a recommendation engine, and more particularly to a recommendation engine that recommends a WEB API.

2. Discussion of Related Art

Applications increasingly consume services via Application Programming Interfaces (APIs) in cloud-provided runtimes. A cloud-provided runtime is a category of cloud computing service that provides a platform allowing customers to develop, run, and manage applications without the complexity of building and maintaining the infrastructure typically associated with developing and launching an application.

A server-side web API is a programmatic interface consisting of one or more publicly exposed endpoints to a defined request-response message system, typically expressed in JavaScript Object Notation (JSON) or Extensible Markup Language (XML) and exposed via the web by means of a Hypertext Transfer Protocol (HTTP-based) web server. Endpoints specify where resources lie that than be accessed by third party software. Usually the access is via a Universal Resource Locator (URL) to which HTTP requests are posed, and from which a corresponding response is expected.

However, since there are thousands of different web APIs available and different versions of each, it is difficult for a device running an automated test process or a user such as a developer to pick the right web API.

BRIEF SUMMARY

A computer-implemented method according to an exemplary embodiment of the invention is provided for recommending a web application programming interface (API). The method includes a cloud computing service retrieving test source code from a remote computer; the cloud computing service determining whether a call to a first web API among a plurality of web APIs is present in the test source code; and when it is determined that the call is present, the cloud computing service reading at least one log file to extract information about at least application that have used the first web API being used; the cloud computing service determining a first quality of the first web API from the extracted information; and the cloud computing service sending a message to the remote computer recommending a second web API among the web APIs having a second quality higher than the first quality.

A computer system according to an exemplary embodiment of the invention is provided for recommending a web application programming interface (API). The computer system includes a memory storing a cloud computing service; and a processor configured to execute the cloud computing service. The cloud computing service is configured to retrieve source code from a remote computer and determine whether a call to a first web API among a plurality of web APIs is present in the test source code. The cloud computing service reads at least one log file to extract information about at least one application that has used the first web API, determines a first quality of the first web API from the extracted information, and sends a message to the remote computer recommending a second web API among the web APIs having a second quality higher than the first quality, when it determines that the call is present.

A computer program product according to an exemplary embodiment of the invention is provided for recommending a web application programming interface (API). The computer program product includes a computer readable storage medium having program instructions embodied therewith. The program instructions are executable by a processor to perform a method including: retrieving test source code from a remote computer; determining whether a call to a first web API among a plurality of web APIs is present in the test source code; and when it is determined that the call is present, reading at least one log file to extract information about at least one application that has used the first web API. The method further determines a first quality of the first web API from the extracted information; and sends a message to the remote computer recommending a second web API among the web APIs having a second quality higher than the first quality, when it is determined that the call is present.

BRIEF DESCRIPTION OF THE SEVERAL VIEWS OF THE DRAWINGS

Exemplary embodiments of the invention can be understood in more detail from the following descriptions taken in conjunction with the accompanying drawings in which.

DETAILED DESCRIPTION OF THE EXEMPLARY EMBODIMENTS

The inventive concept will be described in more detail with reference to the accompanying drawings, where exemplary embodiments of the present disclosure have been illustrated. Throughout the drawings, same or like reference numerals are used to represent the same or like components. However, the present inventive concept can be implemented in various manners, and thus should not be construed to be limited to the embodiments disclosed herein. On the contrary, those embodiments are provided for the thorough and complete understanding of the present disclosure to convey the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Examples are the orchestration of a manufacturing process, a process to retrieve or store goods in a wholesale or retail store, a process to analyze a medical sample or set of samples, a process governing a series of chemical reactions, a process to analyze and file incoming paper documents in a financial institution, a process to manufacture a chemical substance, a process to monitor an automobile engine, a process to monitor a chemical reaction, or a process to monitor a medical device.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Figure 1:
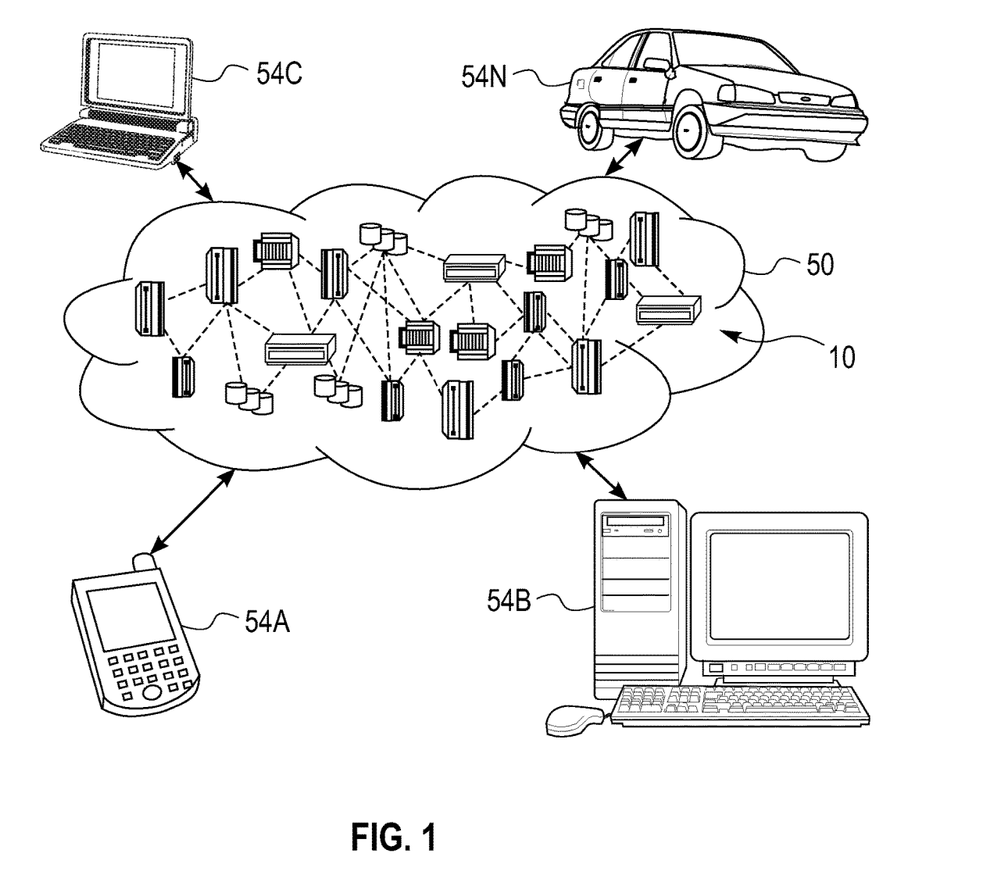
FIG. 1 illustrates a cloud computing environment according to an embodiment of the present invention.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes. Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
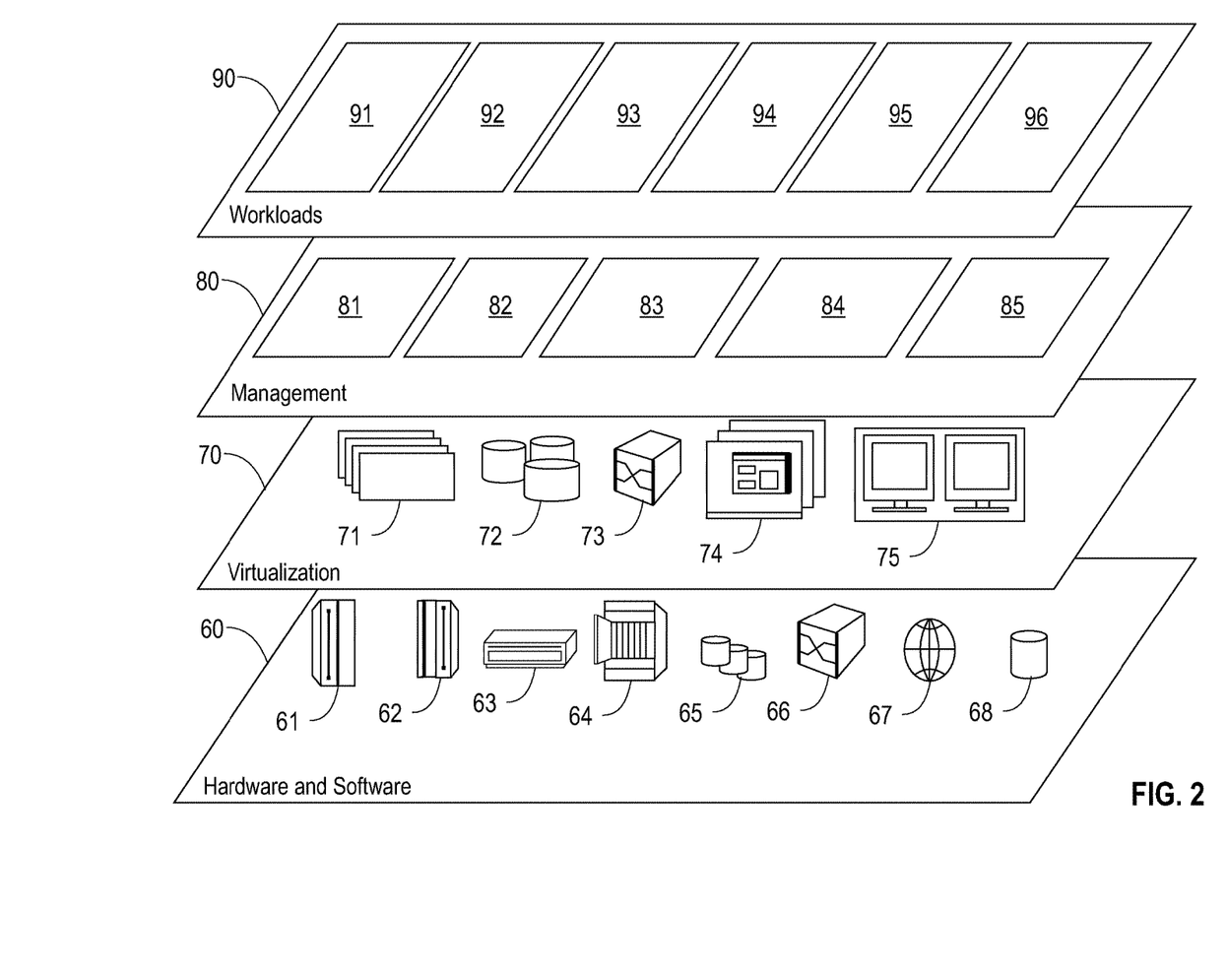
FIG. 2 depicts abstraction model layers according to an embodiment of the present invention, which may be used to implement a web API recommendation engine.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a web API recommendation engine 96, which will be discussed in more detail below.

Figure 3:
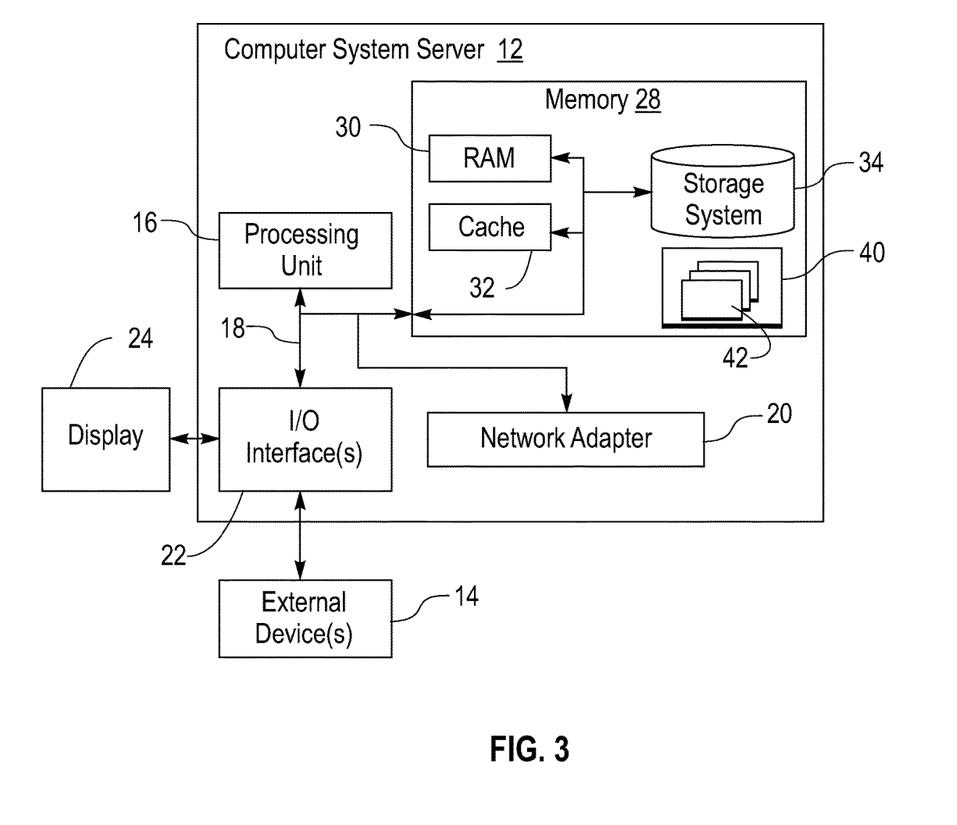
FIG. 3 shows an exemplary computer system on which the web API recommendation engine may be executed.

FIG. 3 illustrates an embodiment of a computer system/server 12 that may be used to implement part of computing devices 54A-54N of FIG. 1, or the web API recommendation engine 96 of FIG. 2, which is applicable to implementing embodiments of the present invention. The computer system/server 12 is only illustrative and is not intended to suggest any limitation as to the scope of use or functionality of embodiments of the invention described herein.

As shown in FIG. 3, the computer system/server 12 is shown in the form of a general-purpose computing device. The components of the computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The computer system/server 12 may include a variety of computer system readable media. Such media may be any available media that is accessible by the computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/non-volatile computer system storage media. By way of example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

A program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. The computer system/server 12 can communicate with one or more networks such as a local area network (LAN), a general wide area network (WAN), and/or a public network (e.g., the Internet) via a network adapter 20. As depicted, the network adapter 20 communicates with the other components of computer system/server 12 via the bus 18. It should be understood that although not shown, other hardware and/or software components could be used in conjunction with the computer system/server 12. Examples of these other hardware and/or software components include, but are not limited to: microcode, device drivers, redundant processing units, external disk drive arrays, RAID systems, tape drives, and data archival storage systems.

The web API recommendation engine 96 combines static information and dynamic information to provide a web API recommendation. The static information may be generated by analyzing application source code (applications or user-provided actions) of a developer to learn which APIs and endpoints are currently being used and how these APIs are being used (e.g., what parameters are used, what data is returned, etc.). The dynamic information may be determined from monitoring requests (e.g., HTTP requests) at runtime and analyzing runtime logs. For example, the dynamic information may include quality of service (QoS) information.

The web API recommendation engine 96 has access to application source code and monitoring data about dynamic API requests. A Cloud-provided runtime (e.g., a cloud platform as a service) like CLOUD FOUNDRY or OPEN-WHISK provides access to the application code in contrast to virtual machines or containers.

Figure 4:
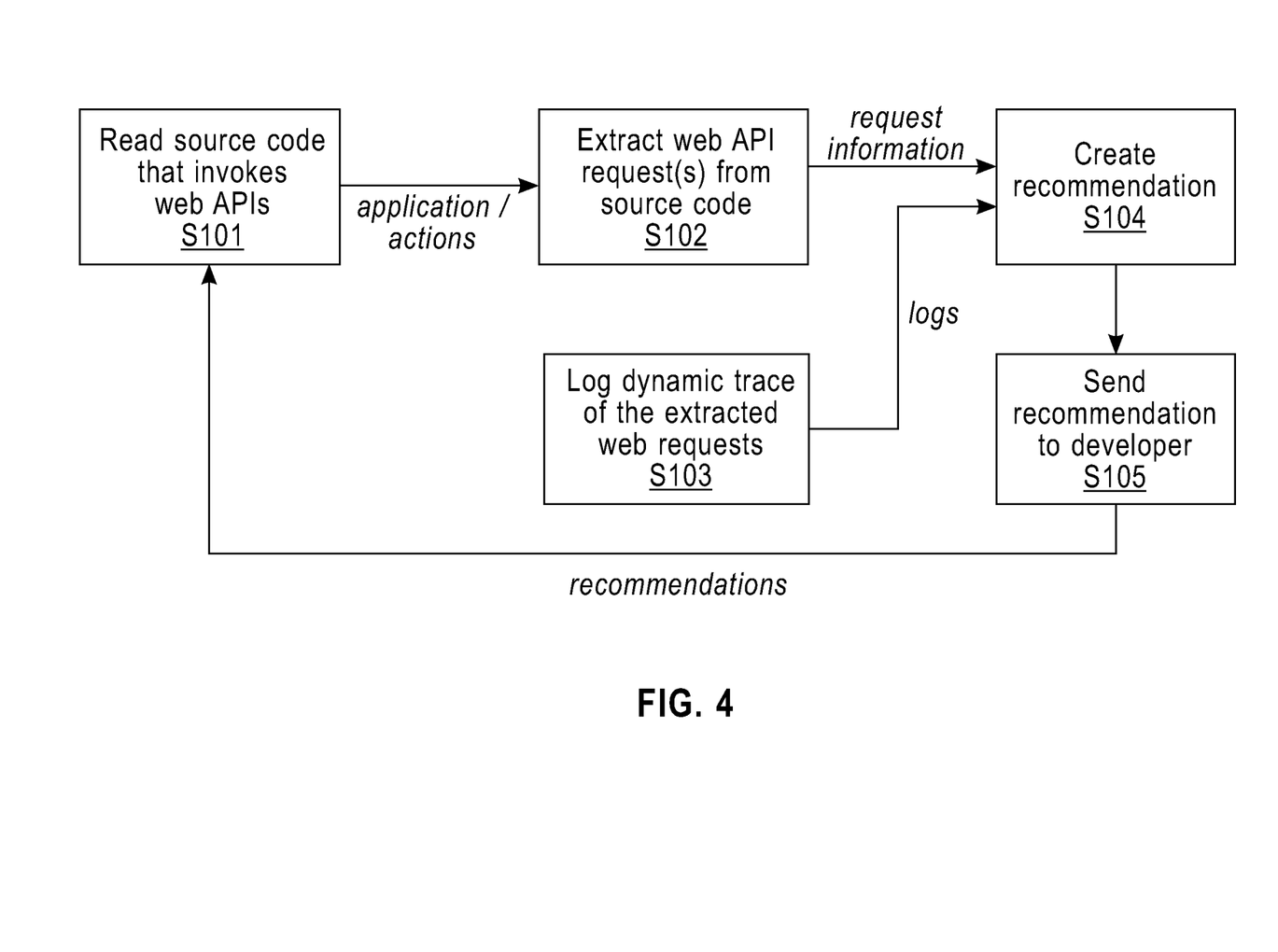
FIG. 4 shows a method of operating the web API recommendation engine according to an exemplary embodiment of the inventive concept.

FIG. 4 illustrates a method of operating the web API recommendation engine 96 according to an exemplary embodiment of the inventive concept. The method includes reading source code that invokes at least one web API (S101). The source code may include at least one serverless action.

In an embodiment, a developer is running the client of a cloud-provided runtime on their computer, and the client presents a graphical user interface (GUI) on a display of the computer that enables the developer to send test code to the cloud-provided runtime. For example, the GUI could enable the developer to select a file on their computer for upload across the Internet to a server housing the cloud-provided runtime. In an embodiment, the GUI runs a program to test whether the file includes sufficient test code, and if the test determines the test code is not sufficient, the GUI provides an error message to the developer. In an embodiment, the test code is sufficient when it includes at least one web API request.

In an embodiment, the GUI packages the test code in a payload of a message with a header that indicates the payload contains test code to be used in providing a web API recommendation. The cloud-provided runtime can recognize the received message includes the test code from reading the header, and then reads the test code. For example, the read may include the cloud-provided runtime executing an open function on the received test code.

The method further includes extracting one or more web API request(s) from the source code (S102). In an embodiment, each web API request is located in a function such as a Web action. For example, the Web action could be written as a JavaScript action. In an embodiment, the web API request includes an HTTP request having a web address known as a Uniform Resource Locator (URL). The HTTP request includes text indicating that it is an HTTP request such as "https:" and text of an URL. The URL may include a web address of a web server and directory information indicating the location of a function on the webserver that responds to the request. The directory information may also indicate the version of the function. The HTTP request may include one or more parameters. For example, if the HTTP request is for weather data, the URL could be the web address of a server that stores a function capable of providing weather data and the parameters could indicate the city for which the weather data is to be retrieved.

Figure 5:
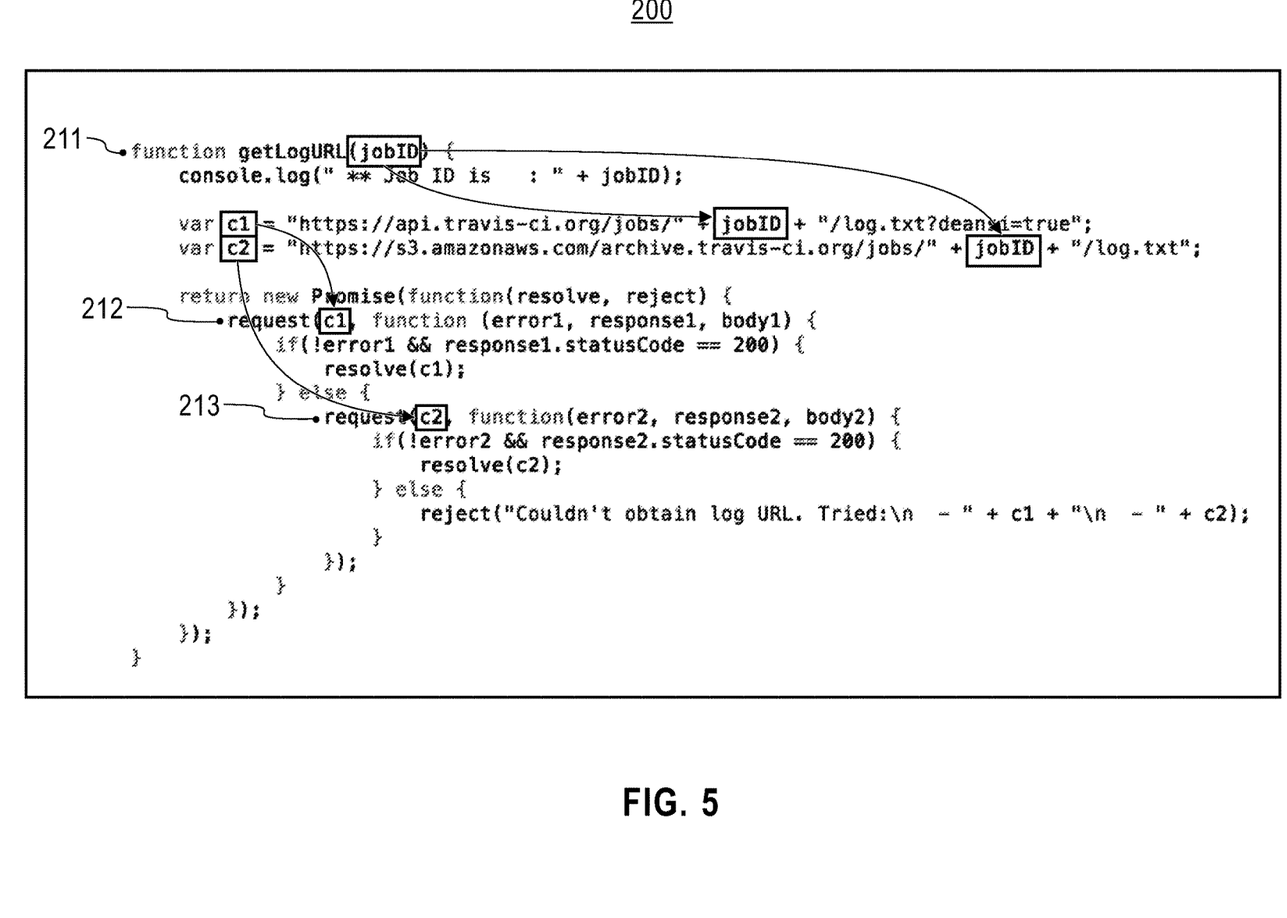
FIG. 5 shows sample test code that may be operated on by the web API recommendation engine.

FIG. 5 illustrates an example of test code 200 that can be operated on by the cloud-provided runtime to perform the web API recommendation. The test code 200 includes a web action 211, which includes a first web API request 212 and a second web API request 213. In an embodiment, extraction code of the cloud-provided runtime determines it has found a web action when its parsing of the test code 200 returns a first token having text of 'function' spaced apart from a second token having text indicating the name of the function (e.g., see function name 'getLogURL' of FIG. 5). The second token may include one or more parameters. In the example shown in FIG. 5, the function receives a parameter entitled 'jobID'. The extraction code may exit if it is not able to find a web action.

If the extraction code is able to find a web action, it continues to parse the test code 200. If the continued parsing returns a third token having text indicating a variable (e.g., 'var'), a fourth token having text indicating a name of the variable, and a fifth token having text indicating an URL (e.g., 'https:xxx'), the extraction code extracts the URL and associates the extracted URL with the variable. For example, as shown in FIG. 5, the extraction code would extract a first URL of "https:api.travis-ci.org/hobs/" and associate it with a first variable 'c1'. If there are additional tokens after the extracted URL, the extraction code may consider these to be first parameters, and associate these first parameters with the first variable. For example, as shown in FIG. 5, the first parameters would include 'jobID' and 'log.txt?deansi=true'.

The extraction code may continue parsing the test code 200 for additional variables. For example, as shown in FIG. 5, the extraction code would next extract a second URL of "https:s3.amaxonaws.com/archive.travis-ci.org/jobs" and second parameters of 'jobID' and '/log.text' and associate them with a second variable 'c2'.

While the test code 200 shown in FIG. 5 includes several variables, the test code 200 need not contain any variables. Further, if an extracted variable does not include an URL, it can be ignored.

The parsing continues until zero or more web API requests are found. If no web API requests, the extraction code may exit with an error code indicating the test code 200 is not sufficient for performing a recommendation. The extraction code may determine that a web API request is present when it encounters a token having text that is indicative of a request such as 'request'. Upon encountering this token, the extraction code knows that a web API request is potentially present. The extraction code may determine that the web API request is present when the next token is the same as one of the prior extracted variables that includes an URL or it includes an URL. For example, as shown in FIG. 5, the extraction code determines that a first web API request 212 is present since a token after the token having text 'request' is the same as a previously extracted variable 'c1' having an URL, and determines that a second web API request 213 is present since a token after the second token having text 'request' is the same as previously extracted variable 'c2' also including an URL. The extraction code may determine whether the request is an HTTP post if it encounters a token such as request.post or it encounters a token specifying the method type such as 'method:POST' after a token named 'request'.

Figure 6:
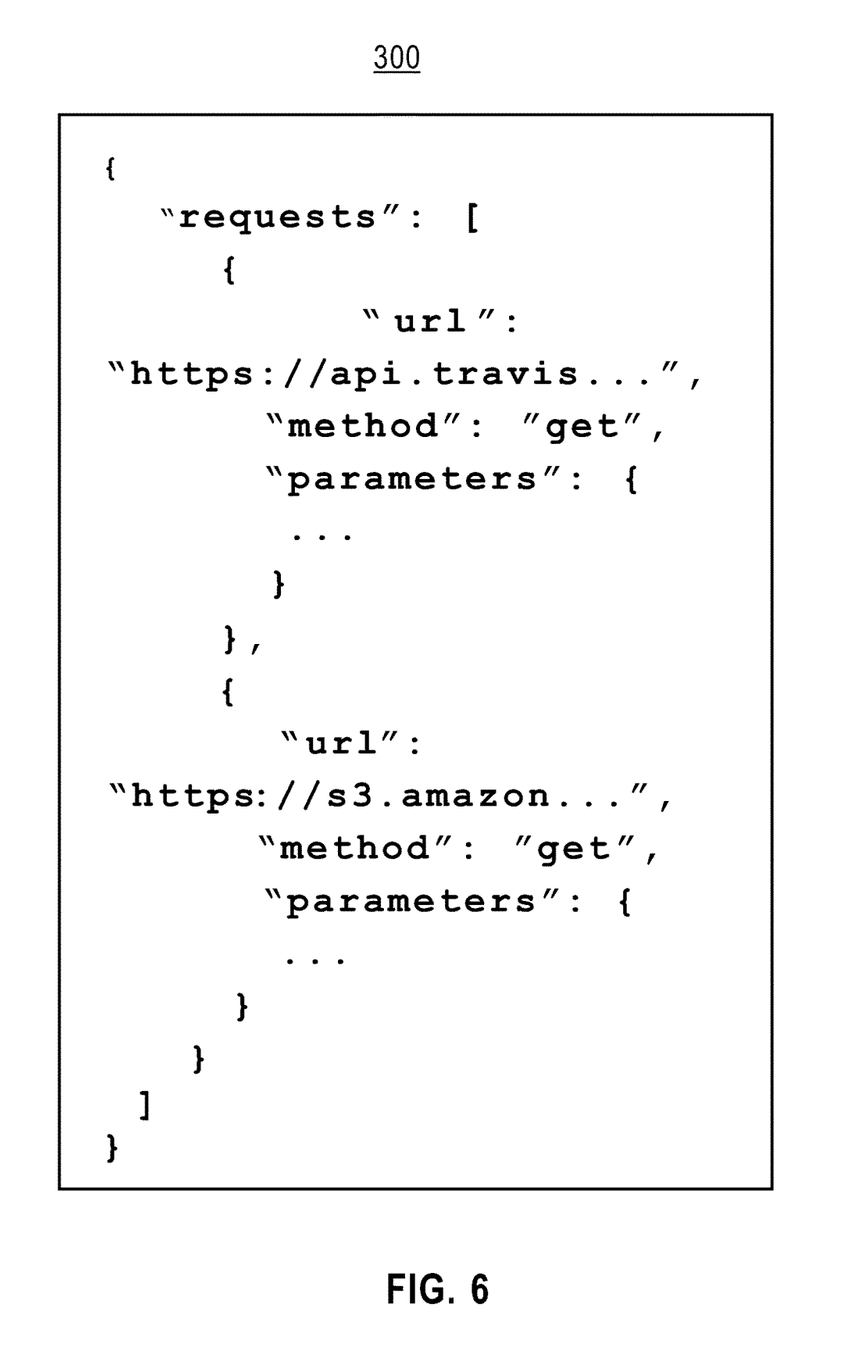
FIG. 6 shows exemplary output generated by the web API recommendation engine when operated on the sample test code.

In an embodiment, the extraction code generates code in a JSON format based on the web API requests determined from the test code 200 that includes information about the web API requests. FIG. 6 shown an example of code 300 in a JSON format that corresponds to the web API requests extracted from the test code 200 of FIG. 5. In this example, the JSON code 300 includes a tag (e.g., "requests":) indicating that web API requests are present, and a listing including text associated with each of the web API requests. For example, each item in the listing may include a first tag (e.g., "url":) indicating that that an URL is present, a second tag (e.g., "method":) indicating that a HTTP method is present in the request, and a third tag (e.g., "parameters":) indicating that parameters to be passed to the request are present. For example, text after the first tag may indicate the URL, text after the second tag may indicate the type of method (e.g., "get", "post", etc.), and text after the third tag may indicate the actual parameters that are to be passed to the web API request. If the second tag is not present the extraction code may assume that an HTTP GET is present in the request.

The method further includes logging a dynamic trace of the extracted web API requests (S103). The cloud-provided runtime may have previously logged use of various web APIs by various application, which may include the web API associated with the extracted web API requests. So this logging may have started before the web API requests were extracted from the test code. If the cloud-provided runtime is not currently logging use of web APIs or is not currently logging use of web APIs associated with the extracted web API requests, the cloud-provided runtime can configure a logging routine to begin logging these events.

Figure 7:
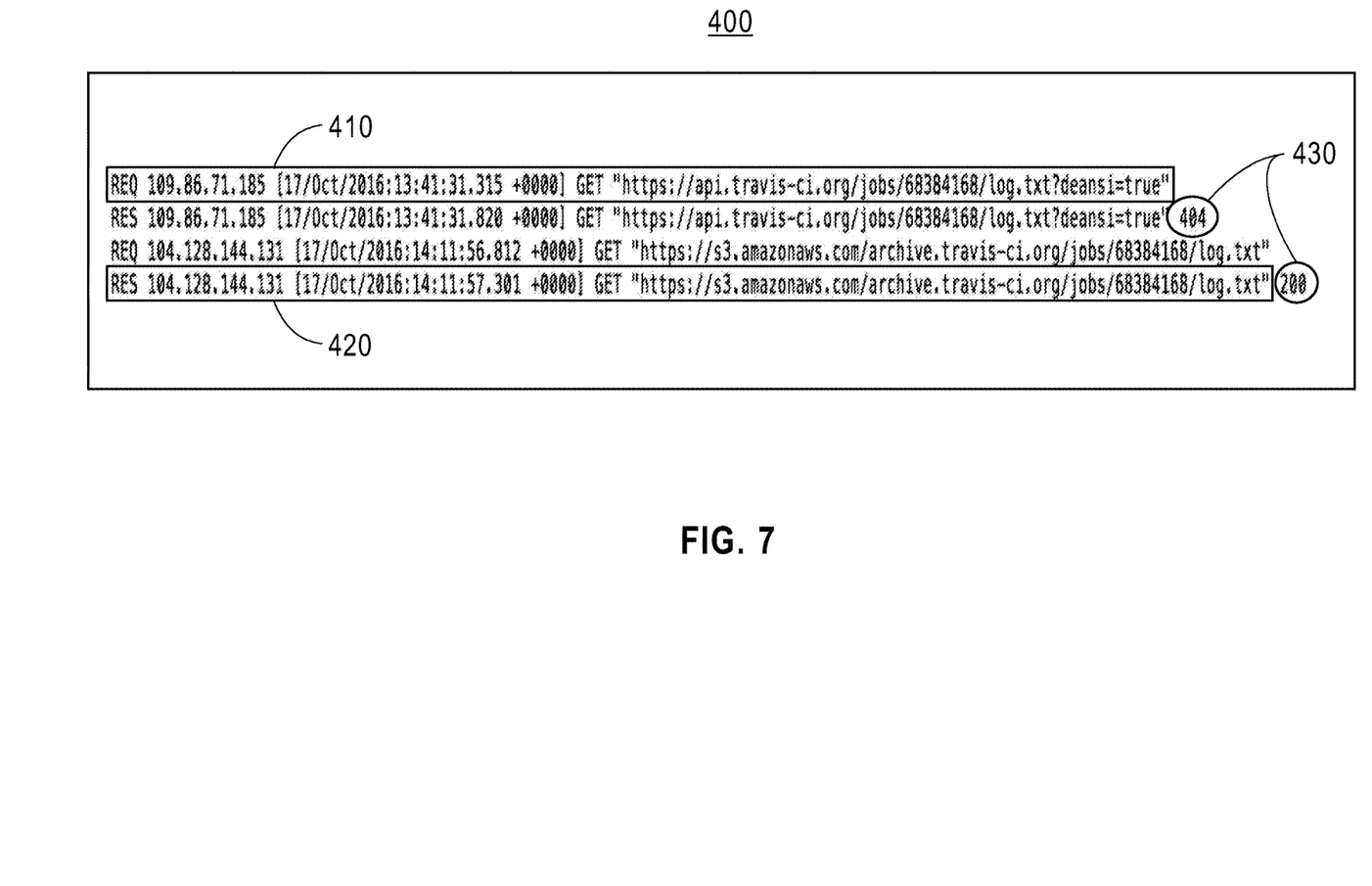
FIG. 7 shows an exemplary log file that may be analyzed by the web API recommendation engine.

FIG. 7 shows an example of a log file 400 generated by the logging that includes request information 410 and response information 420. The request information 410 may include information (e.g., 'REQ') indicating it is request information so it can be differentiated from the response information 420. The response information 420 may include information (e.g., 'RES') indicating it is response information so it can be differentiated from the request information 420. In an embodiment, the response information 420 that includes information received in response a request and is located on the next line after the request information 410 associated with the request.

The request information 410 may include information indicating the internet protocol (IP) address of the computer that is to respond to the web API request and the corresponding response information 420 may include the IP address of the computer that responded to the web API request.

The request information 410 may further include a time when the web API request was initiated (request time) and the corresponding response information 420 may include a time when the response to the web API request was received by the party that issued the request (e.g., response time). The cloud-provided runtime can determine latency of the web API request by subtracting the response time from the request time. The request information 410 may further include the date when the web API request was initiated and the corresponding response information 420 may include the date when the response to the web API request was received by the party that issued the request. The dates may be used along with the times to determine the latency.

The request information 410 may include text indicating the type of HTTP request (e.g., GET, POST, etc.) that was initiated by the party and the corresponding response information may include text indicating the type of the HTTP request being responded to.

The request information 410 and the response information 410 may include the URL associated with the computer that is responding to the request.

The response information 420 may additionally include status information 430 (e.g., a status code), which indicates whether or not the request was successful or failed. For example, the status information 430 may be a first value to indicate a success and a second other value to indicate a failure.

The method further includes creating a recommendation that indicates one web API among a plurality of web APIs (S104). For example, if the test code 200 includes a first web API and has a first quality below a certain quality threshold, the recommendation identifies a second web API having a second quality higher than the first quality or higher than the quality threshold. The creating of the recommendation may include aggregating the logs, deriving at least one quality of service (QoS) from the aggregated logs, and generating the recommendation from each derived QoS. For example, the cloud-provided runtime can obtain metrics on the responsiveness and/or the error rate of a given web API by analyzing the log files, to determine which web API to recommend.

For example, the average response time for a given web API may be calculated by summing the calculated latencies for the given web API and dividing the result by the number of logged requests to the given web API. For example, a counter can be incremented each time a request to a given web API is responded to successfully to generate a count, and that count can be divided by the total number of requests to the given web API including the ones that failed to calculate the error rate of the web API. The cloud-provided runtime can exclude the requests that failed from the calculation of the response time.

Figure 8:
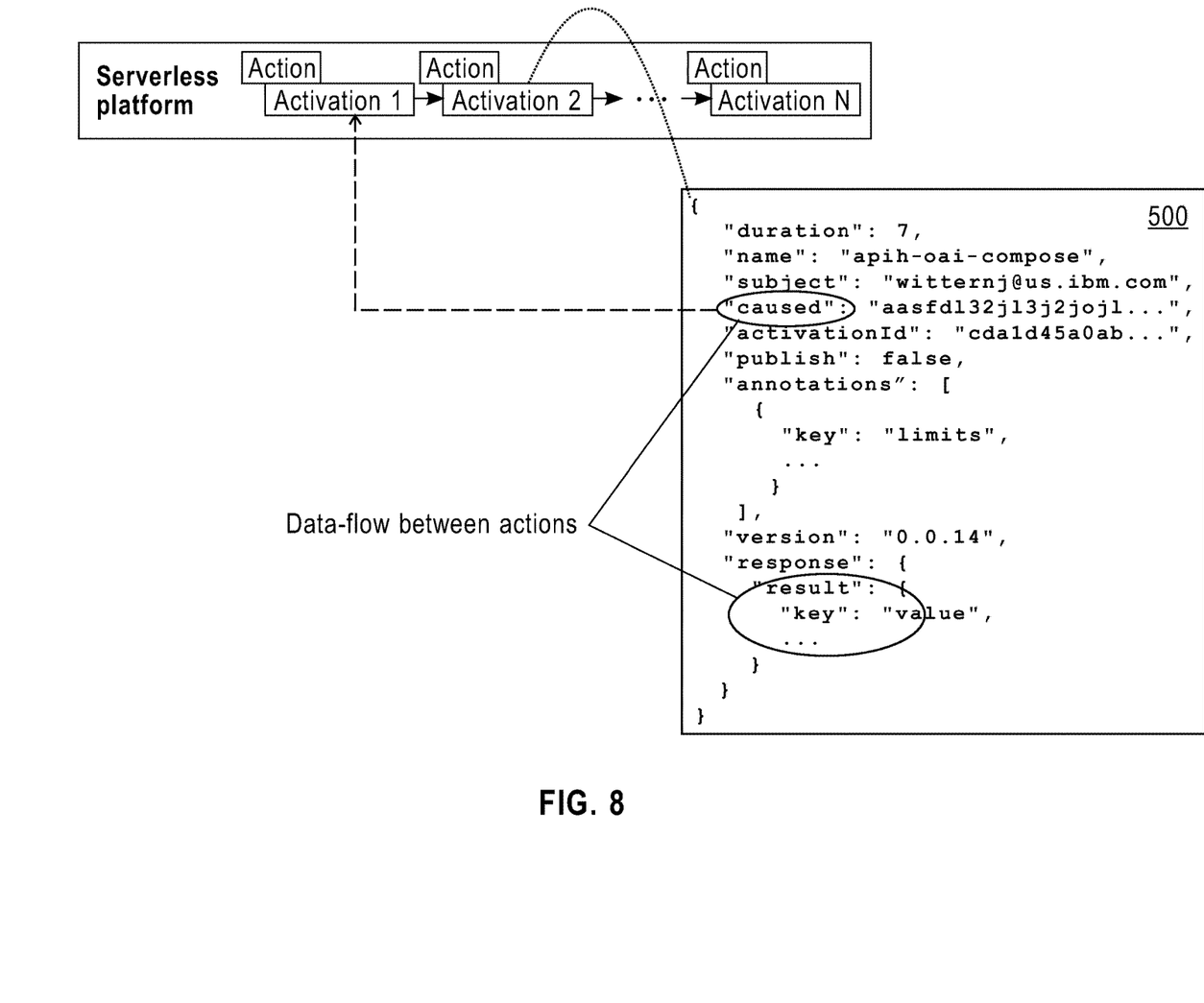
FIG. 8 illustrates an exemplary group of dependent web actions.

As shown in FIG. 8, when a serverless platform such as the cloud-provided runtime executes a web action, an object (e.g., see web Activation 1, 2, . . . , N) is instantiated to perform the web action. FIG. 8 shows a series of interrelated web actions that call one another, where the second Activation (i.e., Activation 2) associated with the second web action generates data 500 including information about the second web action and what triggered it. In an embodiment, the data 500 is in a JSON format. For example, the data 500 may include information on the duration of the web action, a name identifier of the web action (e.g., "apih-oai-compose") being executed, a name identifier (e.g., "aafd132j . . . .") of the web action (e.g., the first web section) that caused the web action (e.g., the second web action) to be executed, a version of the web action (e.g., "version"), and the data that was sent to the web action (e.g., "value"). For example, the "value" shown in FIG. 8 may represent the data passed from the first web action (e.g., Action 1) to the second web action when the first web action called the second web action. The cloud-provided runtime may access the data 500 using a call to the web activation (e.g., Activation 2).

The creation of the recommendation may include analyzing the log files (e.g., see 400 in FIG. 7) and the data maintained by the web activations (e.g., see 500 in FIG. 8) to determine a base URL, an URL path of the base URL, and the data passed to the web actions. The web API can be identified from the base URL. An endpoint (e.g., a web service endpoint) can be identified from the URL path. The endpoint is a web address at which clients of a specific service can gain access to the service.

Each request information 410 and corresponding response information 420 may be grouped together into a tuple. The tuples may then be grouped based on a particular policy. For example, tuples having calls to the same web API (e.g., same base URL) may be grouped together. Other groupings can be made based on API functions or categories, API provides, API cost, etc. Tuples relevant to the current timeframe (e.g., last week, last month) may be selected for analysis. The resulting tuples may be analyzed to determine how often server/user errors occurs, the size the requests, and the size of the responses. For example, if errors are common (e.g., errors occurs in >30% of the requests) when using a first web API among several web APIs that are used retrieve weather data, the cloud-provided runtime can select another one of the web APIs where errors are rarely encountered (e.g., errors occur in <5% of the requests). The cloud-provided runtime may consider more than one factor when making a recommendation. In an embodiment, the cloud-provided runtime considers the percent of requests that succeed, the duration of the requests, and the current timeframe. For example, the cloud-provided runtime could recommend a web API where 95% of the requests have succeeded in less than 200 ms in the last hour. Resampling, moving averages, and least square methods may be applied to the data of the tuples to eliminate random noise.

The method further includes sending the recommendation to the developer (S105). The cloud-provided runtime can provide the recommendation to the developer while the developer is writing their code. For example, the code editor of the client of the cloud-provided runtime that the developer is using to write their code may display a popup menu suggesting a different API after the user types in part or all of a name of a web API that is capable of performing the same function. For example, if the user types the name of a web API into the client that is typically used to retrieve weather data, and the cloud-runtime has discovered a better one, the cloud-runtime can cause a message to popup on a display of the developer through the client informing the developer of the better web API. The popup may indicate reasons why the recommended web API is better and offer to auto-replace the previously entered web API with the recommended web API.

The cloud-provided runtime may consider the endpoints used when making a web API recommendation. For example, if the endpoint of a first web API has better latency than the endpoint of a second web API, the cloud-runtime could recommend the second web API.

The cloud-runtime may consider the geographic location of the server deploying the web actions. For example, even though the same type of web API is deployed in country A and country B, it is possible that the web API is maintained better in country B. For example, if the cloud-provided runtime determines that the same web API has the highest quality in country A, it could recommend the web API with an endpoint that is associated with country A.

The cloud-provided runtime may recommend a web API from information it has collected from multiple other developers. For example, if the cloud-provided runtime determines that 90% of developers use a given web API to support the same functions implemented by a current developer, the cloud-provided runtime can recommend that web API to the current developer.

The cloud-provided runtime may consider expected availability of several web APIs in determining which of the web APIs to recommend. In an embodiment, the expected availability is the ratio of requests that succeed verses the ones that fail. For example, the logs may shows that many web API requests were cancelled due to a timeout error, which indicates the API could not be reached (i.e., has a diminishing availability).

The cloud-provided runtime may consider the parameters the developer is using with a given web API to determine whether to recommend a different web API. For example, if the test code being analyzed uses a first web API with a particular parameter known to severely increase the latency of the first web API, and the cloud-provided runtime has observed that a second web API using the same parameter has a much smaller increase in latency, the cloud-provided runtime can recommend the second web API.

The recommended API can be provided through an integrated development environment (IDE) that includes a code editor, a compiler or interpreter, and a debugger that the developer accesses through a single graphical user interface. The recommended API can also be provided within a cloud-based editor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for recommending a web application programming interface (API), the method comprising:
   retrieving, by a cloud computing service, test source code from a remote computer;
   determining, by the cloud computing service, whether a call to a first web API among a plurality of web APIs is present in the test source code; and
   when it is determined that the call is present,
      determining, by the cloud computing device, a parameter used by the call;
      determining, by the cloud computing device, a first latency increase caused by the first web API using the parameter;
      reading, by the cloud computing service, at least one log file to extract information about at least application that has used the first web API;
      determining, by the cloud computing service, a first quality of the first web API from the extracted information and the first latency increase; and
      sending, by the cloud computing service, a message to the remote computer recommending a second web API among the web APIs having a second quality higher than the first quality,
      wherein the second quality is determined from a second latency increase caused by the second web API using the same parameter.

2. The computer-implemented method of claim 1, wherein the cloud computing service determines the call is present when it determines a web action including a uniform resource locator (URL) is present in the test source code.

3. The computer-implemented method of claim 2, wherein the URL is included in a Hypertext Transfer Protocol (HTTP) request within the test code.

4. The computer-implemented method of claim 1, wherein the log file includes a first time indicating when the call sent a Hypertext Transfer Protocol (HTTP) request to the first web API and a second time indicating when a response was received from the first web API based on the request.

5. The computer-implemented method of claim 4, wherein the determining of the first quality comprises subtracting the second time from the first time to determine a first latency, the first quality is determined from the first latency and the first latency increase, and the second quality is determined from a second latency of the second web API and the second latency increase.

6. The computer-implemented method of claim 1, wherein the determining of the first quality comprises:
   determining a first count of hypertext transfer protocol (HTTP) requests sent to the first web API during a period of time;
   determining a second count of the HTTP requests that were successful during the period;
   determining a success rate by dividing the second count by the first count; and
   setting the first quality based on the first latency increase and the success rate.

7. The computer-implemented method of claim 6, wherein the determining of the second count is based on a status code in the log file indicating whether the HTTP requests were successful.

8. The computer-implemented method of claim 1, wherein the message is sent after the cloud computing service determines the developer has entered the first web API into a code editor.

9. The computer-implemented method of claim 1, further comprising the cloud computing service sending a message to the remote computer indicating that a recommendation cannot be provided based on the test source code.

10. The computer-implemented method of claim 1, where the call is a web action and the executing instantiates a web activation associated with the web action.

11. The computer-implemented method of claim 10, wherein the determining of the first quality comprises:
   accessing the web activation to retrieve information indicating data passed to the web action; and determining the first quality from the extracted information, the first latency increase, and the data.

12. A computer system for recommending a web application programming interface (API), the computer system comprising:
a memory storing a cloud computing service; and
a processor configured to execute the cloud computing service,
wherein the cloud computing service is configured to retrieve source code from a remote computer and determine whether a call to a first web API among a plurality of web APIs is present in the test source code,
wherein the cloud computing service determines a parameter used by the call, determines a first latency increase caused by the first web API using the parameter, reads at least one log file to extract information about at least one application that has used the first web API, determines a first quality of the first web API from the extracted information and the first latency increase, and sends a message to the remote computer recommending a second web API among the web APIs having a second quality higher than the first quality, when it determines that the call is present,
wherein the second quality is determined from a second latency increase caused by the second web API using the same parameter.

13. The computer system of claim 12, the cloud computing service determines the call is present it determines a web action including a uniform resource locator (URL) is present in the test source code.

14. The computer system of claim 12, wherein the URL is included in a Hypertext Transfer Protocol (HTTP) request within the test code.

15. The computer system of claim 12, wherein the log file includes a first time indicating when the call sent a Hypertext Transfer Protocol (HTTP) request to the first web API and a second time indicating when a response was received from the first web API based on the request, wherein a first latency is determined by subtracting the second time from the first time, the first quality is determined from the first latency and the first latency increase, and the second quality is determined from a second latency of the second web API and the second latency increase.

16. The computer system of claim 12, wherein the cloud computing services determines the first quality by:
determining a first count of hypertext transfer protocol (HTTP) requests sent to the first web API during a period of time;
determining a second count of the HTTP requests that were successful during the period;
determining a success rate by dividing the second count by the first count; and
setting the first quality based on the first latency increase and the success rate.

17. The computer system of claim 12, wherein the message is sent after the cloud computing service determines the developer has entered the first web API into a code editor.

18. The computer system of claim 12, wherein the cloud computing service sends a message to the remote computer indicating that a recommendation cannot be provided based on the test source code.

19. A computer program product for recommending a web application programming interface (API), the computer program product comprising a computer readable storage medium having program instructions embodied therewith, wherein the program instructions are executable by a processor to perform a method comprising:
retrieving test source code from a remote computer of the developer;
determining whether a call to a first web API among a plurality of web APIs is present in the test source code; and
when it is determined that the call is present,
determining a parameter used by the call;
determining a first latency increase caused by the first web API using the parameter;
reading at least one log file to extract information about at least one application that has used the first web API;
determining a first quality of the first web API from the extracted information and the first latency increase; and
sending a message to the remote computer recommending a second web API among the web APIs having a second quality higher than the first quality,
wherein the second quality is determined from a second latency increase caused by the second web API using the same parameter.

20. The computer program product of claim 19, wherein the cloud computing service determines the call is present when it determines a web action including a uniform resource locator (URL) is present in the test source code.

* * * * *